United States Patent Office 3,746,554
Patented July 17, 1973

3,746,554
PROCESS FOR PREPARING A SPRAY DRIED LACTOSE AND SACCHARIN SWEETENER
Clarence J. Endicott, Waukegan, Ill., Paul W. Brown, Columbus, Ohio, and Leonard S. Andrews, Morton Grove, Ill., assignors to Abbott Laboratories, North Chicago, Ill.
No Drawing. Continuation-in-part of application Ser. No. 855,024, Sept. 3, 1969, which is a continuation-in-part of application Ser. No. 508,591, Nov. 18, 1965, now abandoned. This application July 23, 1971, Ser. No. 165,583
Int. Cl. A23l 1/26
U.S. Cl. 99—141 A                  7 Claims

ABSTRACT OF THE DISCLOSURE

A low bulk density sweetener having a sweetness equivalent to the sweetness of an equal volume of sucrose comprising lactose and saccharin and a process whereby the sweetener is produced by dissolution of the ingredients in water, injection of carbon dioxide into the solution and spray drying of the solution to form sweetener particles of low bulk density and stabilizing the sweetener particles by treating the same with certain organic solvents.

---

This application is a continuation-in-part of U.S. application Ser. No. 855,024, filed Sept. 3, 1969, and now abandoned, which is a continuation-in-part of U.S. application Ser. No. 508,591, filed Nov. 18, 1965, now abandoned.

SUMMARY OF THE INVENTION

This invention relates to a novel sweetener having artificial sweetener and natural sugar constituents and to a novel process for making the same. More specifically, the invention relates to a low bulk density sweetener having a sweetness equivalent to the sweetness of an equal volume of sucrose and comprising lactose and saccharin. The invention also relates to a process whereby the sweetener is produced by dissolution of lactose and saccharin in water, injection of carbon dioxide into the solution, and spray drying of the solution to form sweetener particles and stabilizing the sweetener particles by treating the same with certain organic compounds.

The use of synthetic, artificial sweeteners as a sugar substitute in the human diet for the purpose of reducing intake of natural sugars and thereby facilitating the avoidance of health problems resulting from excessive sugar intake is becoming of increasingly greater commercial importance. One of the problems attendant to the use of artificial sweeteners has been the lack of volumetric equivalence between the artificial sweeteners and artificial sugars. For example, a teaspoon of a saccharin salt has a sweetness approximately 300 times as great as the sweetness of natural sucrose. In order to provide low-caloric sweetness in conveniently usable form, it has been suggested that a natural sugar base be used as a vehicle for the artificial sweetener, the formulated sweetener being treated to greatly decrease the density thereof and make it volumetrically comparable to sugar while maintaining a relatively low actual quantity of sugar in the sweetener. The sweetening composition of this sort previously suggested has had the deficiencies of lack of moisture stability after exposure to humid atmosphere for significant periods of time, lack of acceptable solubility rates in cold liquids, lack of granularity so as to resemble sugar in appearance and to present a suitable appearance, and lack of sufficiently low bulk density so as to significantly reduce the caloric value of such sweeteners in comparison to the caloric value of an amount of sugar having a comparable sweetener power.

The instant invention overcomes the foregoing deficiencies of the prior art products by providing a low-caloric sweetener having a bulk density of about ⅕ the bulk density of sugar, having a comparable sweetness to sugar on a volumetric basis, having an appearance closely resembling that of sugar, being readily soluble in cold or hot water, having a low caloric value in comparison to that of a quantity of sugar having equal sweetening power, being stable under commercially contemplated conditions of temperature and humidity, and being generally pleasing and uniform in appearance. An example of a composition of this product having a sweetness equivalent to a comparable volume of sugar is approximately 98.8% lactose and 1.2% saccharin and a bulk density of about 0.2 gram/milliliter. The product is made by dissolving the lactose and saccharin in warm water to obtain a solution of the constituents in the water, injecting pressurized carbon dioxide gas into the solution, spray drying the carbonated solution in a spray-drying tower, and treating the spray-dried product with an organic compound selected from the group consisting of water-soluble alcohols which include methanol, ethanol, propanol and butanol, and acetone.

It is therefore an object of this invention to provide a novel sweetening composition having improved properties of stability, appearance, low bulk density, solubility, and having a sweetness equal to the sweetness of an equal volume of natural sucrose.

Other objects of this invention are to provide a low bulk density sweetening composition in the form of hollow spherical particles having a granular outer appearance similar to the appearance of natural granulated sucrose and to provide a low bulk density sweetener which is stable to divergent ambient conditions of temperature and humidity such as can be normally encountered in home use of the product by a consumer.

A concomitant object of this invention is to provide a process for the stabilization of a low bulk density sweetener comprising a natural sugar and a physiologically-acceptable saccharin salt by treating the product with an organic compound selected from the group consisting of water-soluble alcohols which include methanol, ethanol, propanol and butanol, and acetone in a controlled environment.

In general, according to the present invention, a mixture of lactose and saccharin or a saccharin salt comprising, for example, 98.8% lactose and 1.2% saccharin is dissolved in water and concentrated to about 50% solids content. The solution is then pumped to a conventional spray drier where, prior to introduction of the solution into the drier, a non-toxic gas such as nitrogen or carbon dioxide is injected into the solution. The solution-gas mixture is then immediately spray dried to produce hollow spherical particles of low bulk density and having an outer appearance similar to granular sugar. While the product resulting from the aforementioned spray-drying process will have a satisfactory low bulk density (0.10–0.20 g./ml.) and hence low caloric value on a volumetric basis, it will lack stability. This instability is exhibited in caking, increase of bulk density, and decrease of solubility upon exposure to humid conditions.

It was found that the lactose in the spray-dried product is amorphous and present in predominantly the $\beta$-form. It is believed that exposure to high humidity causes hydration of the lactose to crystalline $\alpha$-lactose monohydrate. The large amount of water, about 11%–12%, necesssary for crystallization causes fusion and deformation of the spray-dried hollow spherical particles. After crystallization the unbound water is evaporated, leaving a hard cake. The caking results in not only loss of granularity but also a decrease in solubility due to destruction of the thin wall particle structure and the change in the lactose from a highly soluble β-form to a much less soluble α-hydrate. Serious caking of the product results at 40%–50% relative humidity at room temperature with resultant fusion and breakdown of the hollow spherical particles. This results in an undesirable increase in bulk density. Since α-lactose monohydrate is relatively insoluble, particularly in comparison to β-lactose, this may explain the decrease in solubility of the spray-dried product after exposure to humid conditions. It is apparent that for a product designed to provide equivalent sweetness as sugar on a volumetric basis and adapted to be stored under normal conditions of temperature and humidity, such instability resulting in an increase in bulk density, caking, and decrease in solubility cannot be tolerated.

As a means of stabilizing a low bulk density product comprising a natural sugar and a physiologically-acceptable saccharin salt, it has been found that treatment of the spray-dried product with an organic solvent such as a water-soluble alcohol or acetone is effective. By contacting the spray-dried product with the noted organic compounds, for example by spraying or vapor treatment, and then drying to remove the compound, a uniform, free-flowing product results with only a slight increase in bulk density. Subsequent exposure of the treated product to relative humidities ranging from 50% to 90% at room temperature for 40 hours showed that effective stabilization of the spray-dried product was obtained. The treated product is free-flowing after extended exposure to high humidity with no evidence of caking or decrease of solubility. It is believed that treatment of the spray-dried product with the noted solvents results in crystallization of the amorphous material without hydration of the lactose. Treatment can be effected by spraying the amorphous product with the selected compound, by exposing the product to vapors of the selected compound, by utilizing a fluidized bed system of vapor treatment and drying, or by any suitable means effective to expose the amorphous product to the desired organic compound.

The following examples are presented in order to more particularly describe the invention.

EXAMPLE 1

A sweetener containing 98.8% lactose and 1.2% calcium saccharin is prepared by mixing the ingredients in water having a temperature of about 190° F. and sufficient to obtain approximately a 56% solids solution. The feed solution is fed to a spray drier by means of a high pressure pump operated at a pressure of about 1000 pounds per square inch (p.s.i.). Carbon dioxide is injected into the feed solution at a point on the high pressure side of the pump and prior to introduction of the solution into the drier. The $CO_2$-injected feed solution is sprayed into an air stream having a temperature of about 300° F. to obtain a spray-dried product having a bulk density of about 0.10 g./ml.

Since it is desired that the final product be equivalent to sugar in sweetness on a volumetric basis, a definite relation must be maintained between product composition and bulk density. For example, a finished product found by taste tests to be about 10% too sweet at a bulk density of 0.18 g./ml. can be lowered in sweetness level by reducing the bulk density to 0.16 g./ml. If it is desired to maintain the higher bulk density in such a case, then the composition can be modified accordingly, reducing the saccharin content and increasing the lactose content. This of course would have a negative effect on the caloric content of the product.

With sucrose having a bulk density of close to 1.0 g./ml., it is apparent that a product of the present invention having a bulk density of about 0.20 g./ml. would have approximately 20% the caloric value of an equivalent volume of sucrose. At a bulk density of about 0.30 g./ml., the product would have a caloric value of approximately 30% that of an equivalent volume of sucrose. Depending on the caloric content desired, bulk density can be varied from about 0.10 to 0.40 g./ml. In turn, the lactose content of the product can be varied from about 75% to essentially 100% with the remainder of the composition being made up of saccharin and its salts. The amount of saccharin used depends to some extent upon the end use of the product. If intended solely as a coffee sweetener, more saccharin may be required since coffee is somewhat bitter. Likewise, citrate soft drinks may require more saccharin in comparison to cola drinks. Additionally the relative sweetness of saccharin diminishes at higher concentrations. As a consequence, the concentration of saccharin used can vary considerably, however, consonant with the object of the present invention of providing a product equivalent to sugar in sweetness on a volumetric basis and of low caloric content; a saccharin content of from about 0.75% to 3.0% is suitable. Accordingly, a composition range of from 97%–99.25% lactose and 0.75%–3% saccharin is suitable for most purposes with a composition of 98.8% lactose and 1.2% saccharin being preferred.

EXAMPLE 2

Product produced in accordance with the process illustrated in Example 1 is stabilized by treatment with ethanol, applying ethanol vapors to the product in a vacuum blender. Ethanol vapor is admitted to a Pfaudler glass-lined blender (3 cubic feet capacity) containing nine kilograms of spray-dried product. Treated product shows a high degree of crystallinity with lactose predominantly in the β-form, and no α-lactose monohydrate being apparent. Bulk density was 0.21 g./ml. and the product was free-flowing after 40 hours' exposure to 75% relative humidity at room temperature. For adequate crystal conversion, addition of 4–6 ml. of ethanol per 100 grams of product and a 20–30 minute vapor treatment time is sufficient. Below these limits, the ethanol remains bound to the partially amorphous material and prolonged drying is required, even at a drying temperature of 70°–80° C. A vapor treatment and drying process cycle of about 1½ hours is satisfactory.

EXAMPLE 3

The product produced in accordance with the process illustrated in Example 1 is stabilized by treatment with 95% ethanol vapor injected into a rotating and evacuated double-cone blender containing the spray-dried product. About 600 pounds of spray-dried product is charged into a vacuum blender having an operating volume of about 70 cubic feet and maintained at a jacket temperature of 70° C. The blender is evacuated to 5–10 mm. Hg absolute pressure. With the blender rotating at about one revolution per minute, ethanol is pumped into the blender until a total quantity of 26 pounds is injected. After 40 minutes from the start of vapor injection the ethanol vapor is withdrawn through a vacuum system. Drying is continued for a period of 60 minutes, during which the blender jacket temperature is increased to 85° C. After drying, the stabilized product is discharged into suitable containers.

Ethanol, methanol, or acetone containing 5–10% water is preferred in providing stabilization of the spray-dried amorphous product. However, treatment of the spray-dried product with less than a 70% aqueous ethanol solution, i.e., solutions containing more than 30% water resulted in an unsatisfactory caked mass.

What is claimed is:

1. A process of preparing a sweetening product comprising about 75% to 99.25% lactose with the balance an artificial sweetener selected from the group consisting of saccharin and salts thereof to provide a product having a sweetness level comparable to a corresponding volume of granular sugar, said process comprising: dissolving the lactose and artificial sweetener in water to provide a solution thereof; injecting a non-toxic gas into the solution;

spray drying the gas-solution mixture to obtain a product of low bulk density; contacting the spray-dried product with an organic solvent containing less than 30% water and selected from the group consisting of water-soluble alcohols and acetone; and removing substantially all of the organic solvent to obtain a sweentening product of low bulk density and stable to moisture for extended periods.

2. The process of claim 1 wherein the non-toxic gas is carbon dioxide and the organic solvent is ethanol.

3. The process of claim 2 wherein the product comprises from about 97% to about 99.25% lactose and the balance from about 0.75% to about 3% of an artificial sweetener selected from the group consisting of saccharin and salts thereof.

4. The process of claim 3 wherein the product comprises about 98.8% lactose and 1.2% saccharin.

5. A method of stabilizing a spray-dried compositon having a bulk density of about 0.10 to 0.40 g./ml. injected with a non-toxic gas prior to spray drying and comprising about 75% to 99.25% amorphous lactose with the balance an artificial sweetener selected from the group consisting of saccharin and salts thereof to provide a product having substantial stability to moisture for extended periods, said process comprising: contacting the composition with an organic solvent containing less than 30% water and selected from the group consisting of water-soluble alcohols and acetone to convert the amorphous lactose to the crystalline form substantially free of $\alpha$-lactose monohydrate; and removing substantially all of the solvent from the composition.

6. The method of claim 5 wherein the composition comprises from about 97% to about 99.25% amorphous lactose and the balance from about 0.75% to about 3% of an artificial sweetener selected from the group consisting of saccharin and salts thereof and wherein the organic solvent is ethanol.

7. The method of claim 5 wherein the spray-dried product is contacted with an organic solvent containing 5%–10% water.

References Cited
UNITED STATES PATENTS

| | | | |
|---|---|---|---|
| 3,170,801 | 2/1965 | McNaught | 99—141 A |
| 3,259,506 | 7/1966 | Eisenstadt | 99—141 A |

JOSEPH M. GOLIAN, Primary Examiner

U.S. Cl. X.R.

127—31